April 28, 1970     W. E. FOLKERTS     3,508,467
POWER STEERING GEAR
Original Filed Dec. 19, 1967     2 Sheets-Sheet 1
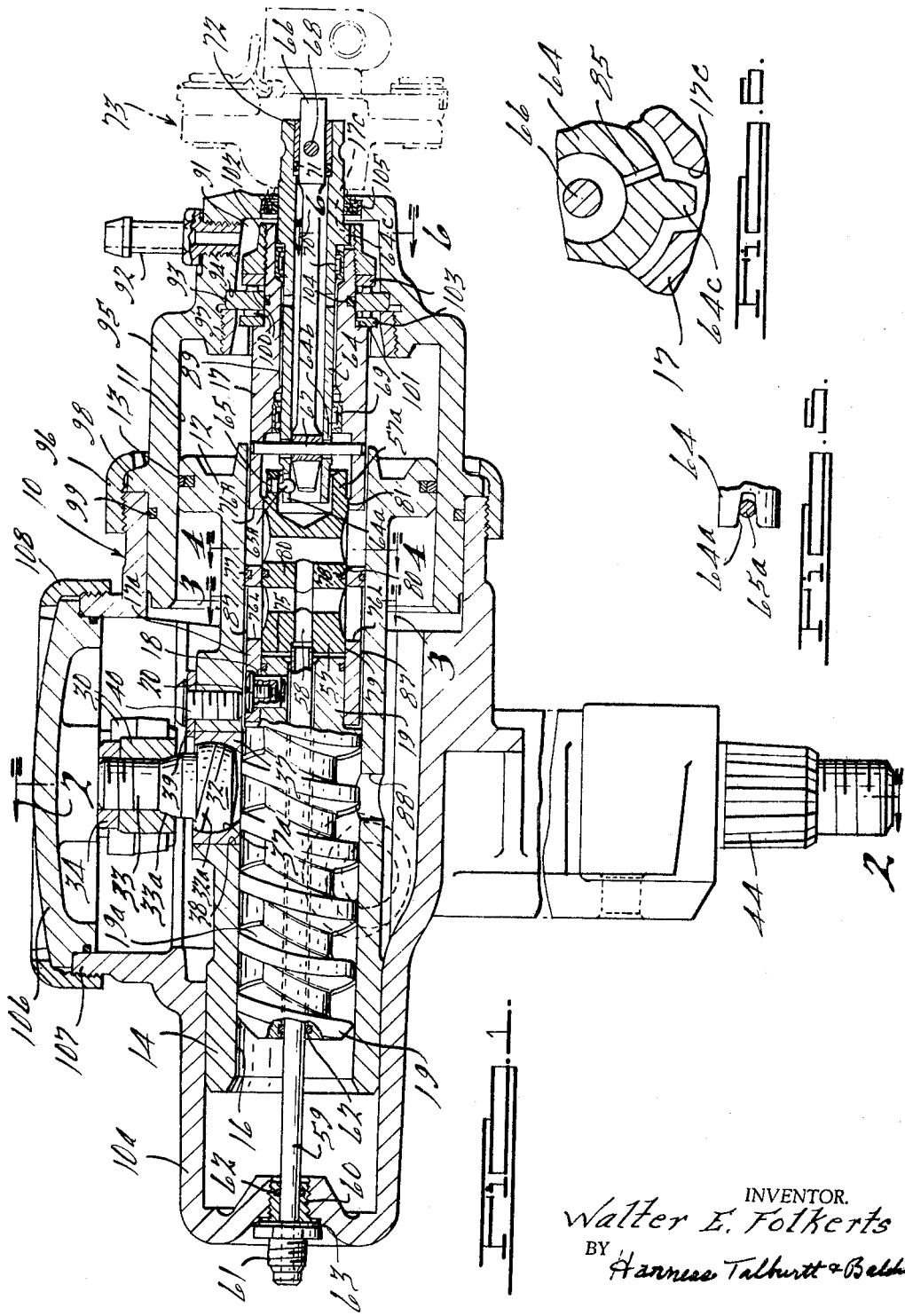
INVENTOR.
Walter E. Folkerts
BY
Harness Talburtt & Baldwin
ATTORNEYS.

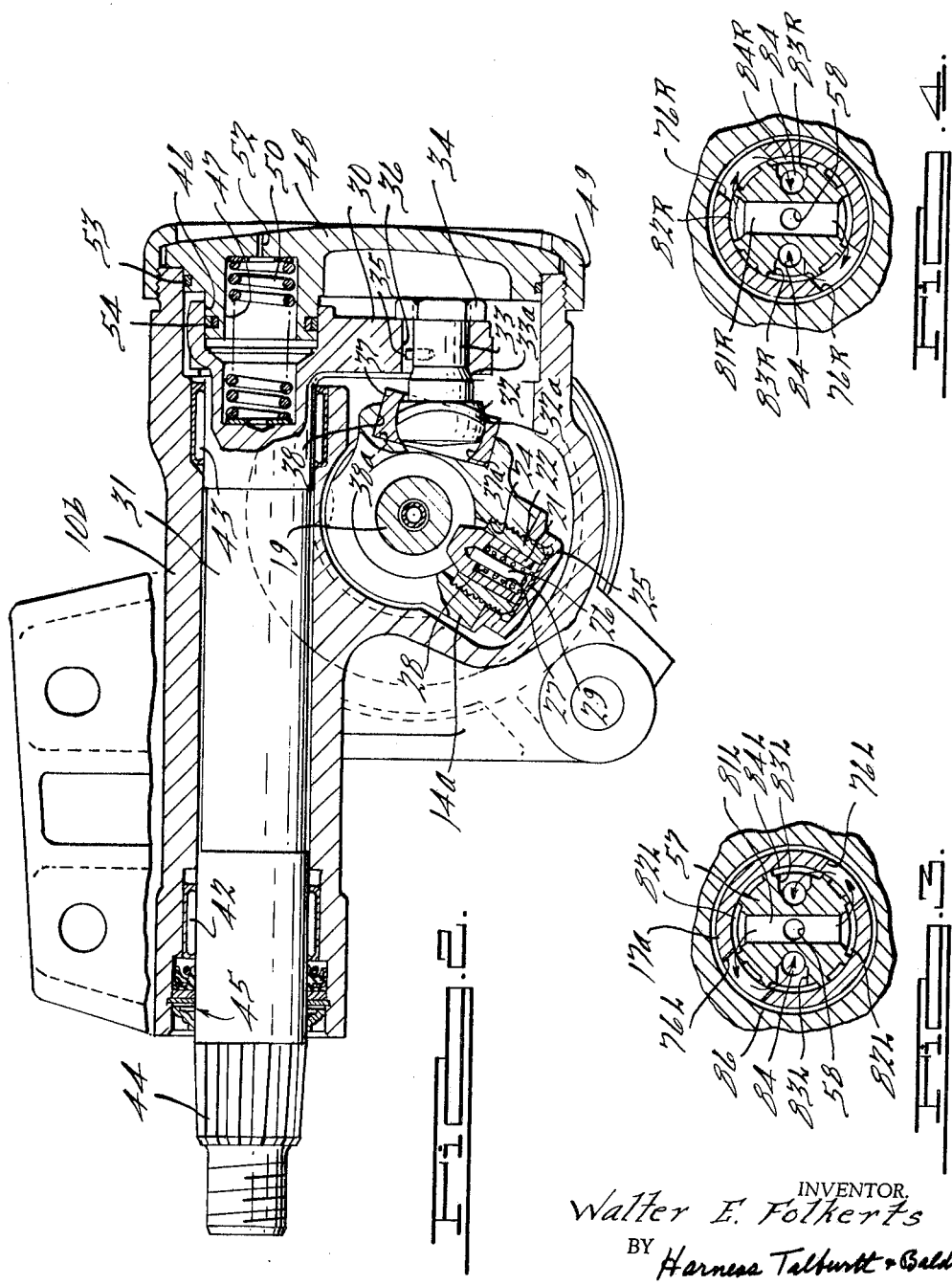

United States Patent Office 3,508,467
Patented Apr. 28, 1970

3,508,467
POWER STEERING GEAR
Walter E. Folkerts, Hazel Park, Mich., assignor to Chrysler Corporation, Highland Park, Mich., a corporation of Delaware
Original application Dec. 19, 1967, Ser. No. 691,859. Divided and this application Feb. 12, 1968, Ser. No. 704,861
Int. Cl. F15b 9/10
U.S. Cl. 91—375    6 Claims

ABSTRACT OF THE DISCLOSURE

A swinging arm of an automobile steering linkage is interconnected with a reciprocable piston, which in turn is operatively connected with a worm coaxial with the piston and keyed to a tubular driven shaft. The latter is sleeved over and cooperable with a rotary valve operable in a pressurized fluid circuit to control power operation of the piston and interconnected steering linkage. A manually rotatable driving shaft having a rotary lost motion driving connection with the driven shaft is connected by a wedge type spline with the valve to rotate the same for power steering, or to rotate the driven shaft and worm manually at the limit of the lost motion in the event of power failure. Fluid pressure applied to the valve maintains the aforesaid wedge type spline and positively avoids lost motion in the valve operation. A torsion rod coaxial with the valve and driving shaft is keyed at one end adjacent the valve to the driven shaft and at its opposite end remote from the valve to the driving shaft to transmit a steering reaction or "feel" to the driver during power steering.

---

This invention is a division of applicant's copending application Ser. No. 691,859, now Patent No. 3,422,698, filed Dec. 19, 1967.

An object of the present invention is to provide a steering gear of the foregoing character having an improved and simplified interconnection between the worm and crank arm, which is adapted for power assisted operation, and which achieves a particularly efficient and responsive steering control for the vehicle compatible with either linear or variable ratio steering.

Another and more specific object is to provide such a gear having a fluid pressure actuated piston reciprocable axially and rotatably within a cylindrical chamber in a housing for the gear, the worm extending coaxially through the piston and being journaled in a tubular extension of the piston, which extension is supported in the housing and comprises supporting means for the interconnection between the worm and crank arm.

The above mentioned interconnection comprises a follower pin having a nose which engages and follows the spiral groove of the worm and which extends through the center of a cylindrical guide carried by and fixed with respect to said tubular extension. The swinging end of the crank arm carries a ball element adjustably seated concentrically within a mating spherical seat also carried by and fixed with respect to the tubular extension of the piston to complete a ball-and-socket type universal coupling. The follower pin is mounted in the guide for spring urged axial movement into its engagement with the worm and for rotation about its axis to minimize frictional contact with the worm.

Rotation of the worm, which can be accomplished manually in the event of power failure, will cause generally axial movement of the follower and piston connected thereto, which in turn will swing the crank arm by reason of the ball-and-socket connection therewith. As the piston moves axially, it will also rotate about its axis sufficiently to compensate for its ball and socket connection with the crank arm. Inasmuch as the crank arm is not connected directly with the worm, the latter need not be formed to compensate for arcuate movement of a connection with the crank arm, as has been necessary heretofore, and economies and simplification in the fabrication of the worm can be obtained.

In accordance with the present invention, the worm follower is carried by the piston extension and is free of direct connection with the crank arm. Thus during power actuation of the piston, the steering load will not be transmitted through the worm follower and the radial relationship between the axes of the follower and worm will remain constant as for example at right angles to each other, upon rotation of the piston. Also, the nose of the follower will remain at a fixed distance from the axis of the worm, thereby enabling the simplified worm construction.

The ball-and-socket coupling comprises a ball shaft secured to and extending from the swinging end of the crank arm generally in parallelism with the latter's axis of pivoting. The ball shaft terminates in an integral ball element having an equatorial zone shaped portion coaxial with the ball shaft and pivotally confined within a mating spherical inner surface of a ring member or annulus or secured to the piston extension. The spherical surface of the ball element is relieved or flattened at a second equatorial zone oblique to the aforesaid zone shaped portion so that when the axis of the integral ball shaft is tilted sufficiently out of alignment with the principal axis of the ring member, the ball element may be inserted within the ring member. Thereafter when the two axes are moved more closely into alignment, the spherical surface of the ball element is trapped within the mating spherical surface of the ring member and axial separation of the ball-and-socket coupling thus provided is prevented.

By this construction, positive ball-and-socket engagement which minimizes play or lost motion is assured throughout the steering movement without recourse to resilient means for yieldingly maintaining this engagement, as required heretofore. A limited axial movement of the ball shaft is necessary to accommodate the limited rotation of the piston and swinging of the crank arm during the steering movement. This latter axial movement is accomplished in the present instance by positively securing the ball shaft, crank arm, and rock shaft together as a unit and by pivotally mounting the rock shaft for limited movement along its pivot axis. A light spring may thus be employed to urge the rock shaft axially in one direction to take up play resulting from production tolerances in the parts, but this spring is not required to maintain the parts in assembled relation. As a result, an exceptionally responsive steering gear is achieved from which play or lost motion and consequent "drift" of the vehicle during straight ahead steering are virtually eliminated.

Other and more specific objects are to provide such an improved power assisted steering gear wherein a driving shaft adapted to be coupled with a manually rotatable steering shaft is rotatably supported coaxially within one end of a rotatable tubular driven shaft connected to the latter shaft by a lost motion spline connection, which enables about 8° of rotation of the driving shaft before the spline connection engages and rotates the driven shaft in a manual steering operation, the opposite end of the driven shaft being positively splined coaxially to the worm shaft for rotation as a unit therewith; wherein a rotary valve in a fluid circuit is sleeved coaxially within the tubular driven shaft to cooperate with radial ports in the latter to actuate the piston in a power assisted steering operation upon rotation of the valve with respect to the unitary worm and driven shafts; wherein the rotary valve is also urged coaxially with respect to the driving shaft by fluid pressure into a wedge type spline engagement with the driving shaft, whereby rotary lost motion between the driving shaft and valve is positively avoided and variations in axial dimensions resulting from cumulative production tolerances are accommodated; and wherein a torsion rod extends coaxially within the driving shaft and is keyed at one end adjacent the valve to the driven shaft for rotation as a unit therewith, and is keyed at its opposite end remote from the valve to the driving shaft for rotation as a unit therewith, whereby an economical and compact structure is achieved which is particularly efficient in operation and characterized by fewer parts and external leak points than comparable structures, and which enables reduction in the overall length of the mechanism, including the driven shaft and the coupling with the manual steering shaft.

Other objects of this invention will appear in the following description and appended claims, reference being had to the accompanying drawings forming a part of this specification wherein like reference characters designate corresponding parts in the several views.

FIGURE 1 is a cross sectional view of a steering gear embodying the present invention, taken generally along the axis of the driven shaft and worm gear and showing the rotary valve somewhat pictorially in the neutral position.

FIGURE 2 is a sectional view along the axis of the rock shaft, taken in the direction of the arrows substantially along the line 2—2 of FIGURE 1.

FIGURE 3 is a transverse sectional view through the valve, taken in the direction of the arrows substantially along the line 3—3 of FIGURE 1.

FIGURE 4 is a transverse sectional view through the valve, taken in the direction of the arrows substantially along the line 4—4 of FIGURE 1.

FIGURE 5 is an enlarged elevational view showing the wedge type connection between the driving shaft and valve.

FIGURE 6 is a transverse sectional view through the lost motion spline connection taken in the direction of the arrows substantially along the line 6—6 of FIGURE 1.

Referring to the drawings a particular embodiment of the present invention is illustrated by way of example in a hydraulically actuated steering gear for an automobile comprising a housing 10 having a cylindrical bore 11 in which a fluid pressure actuated piston 12 is reciprocable. An annular seal 13 around the periphery of the piston 12 cooperates with the latter to partition the bore 11 into left and right parts. The piston 12 is provided with an integral tubular coaxial guide extension or support 14 extending to the left in FIG. 1. A bore 16 extends axially through the entire piston structure. The extension 14 slides axially in guided relation with a cylindrical extension 10a of the housing 10.

An end 17a of a tubular driven shaft 17 is rotatably supported within the bore 16 and is secured by means of hollow pin 18 to the reduced right end of a worm shaft 19 for rotation as a unit therewith. The right end of worm 19 fits coaxially into the bore of tubular shaft 17 and the pin 18 is forced tightly into aligned radial holes in shafts 17 and 19. The pin 18 is provided with an enlarged movement limiting head and is internally threaded to receive a set screw 20 which normally remains within the pin 18 to reinforce its sidewalls. The set screw 20 may be unscrewed and replaced by an externally threaded tool for pulling the pin 18 radially to permit disassembly of the shafts 17 and 19.

The worm portion 19a of the integral shaft 19 may have a variable or constant pitch and is engaged by a rotatable follower pin 21 having a tapered nose adapted to ride along the spiral worm groove upon rotation of the worm 19, FIG. 2. The follower 21 is journaled in a cylindrical bushing 22 secured within a radial enlargement 14a of extension 14, as for example by being screwed therein.

The bushing 22 is aligned with its axis perpendicular to the axis of worm shaft 19 and is seated firmly against an annular internal shoulder 24 of enlargement 14a. A cover member 25 is suitably secured to enlargement 14a over the opening for bushing 22, as for example by bolts not shown. The follower 21 has a radially outwardly opening bore 27 containing a coil spring 28 compressed between the base of bore 27 and a bearing plate 29 which is backed by the cover member 25 and closely spaces the latter from the outer end of bushing 22. An axial load sustaining pin 26, coaxial within coil spring 28 and having its radially inner end bottomed and confined within a reduced portion of the bore 27, has a radially outer rounded bearing end seated against bearing plate 29 to facilitate rotation of follower 21 when the latter is under load, as for example during manual steering as explained below.

An operationing connection between the piston extension 14 and a crank arm 30 of a pivotal cross shaft 31 is accomplished by means of a ball element 32 having an integral stem 33 extending through a hole in the swinging end of the crank arm 30. The stem has a conical shoulder 33a seated firmly against a mating conical surface of the arm 30 and is secured in position by a nut 34. Rotation of the stem and ball element is prevented by means of a pin 35 secured within and extending radially from the side of stem 33 into a key way 36, which extends in crank arm 30 parallel to the axis of shaft 33.

The ball element 32 is confined within the interior spherical surface 37a of a ring 37 seated against the bottom 38a, FIG. 2, of a cylindrical hole 38 which extends radially into the piston extension 14. The ring 37 is held in place by an overlying retainer 39 secured to the outer surface of extension 14 by a bolt 40. A diametrical zonal portion 32a of the surface of ball element 32 oblique to both the axes of shaft 33 and worm 19 is recessed or flattened sufficiently as shown in FIGS. 1 and 2, so that during assembly, the axes of the stem 33 and ring 37 can be canted with respect to each other until the zonal recess 32a is coaxial with the socket 37a, thereby to enable insertion of the ball element 32 into the confines of the inner spherical surface 37a of the ring 37. Thereafter when the stem 33 and ring 37 are assembled with the crank arm 30 and extension 14 respectively as illustrated, the ball element 32 will be trapped and closely confined within the ring 37 to avoid lost motion in the resulting ball-and-socket coupling. Upon swinging of the crank arm 30 and consequent rotation of the piston extension 14, relative universal pivotal movement between the ball element 32 and ring 37 is readily accomplished. Also by the arrangement shown, a minimum impairment of the mating spherical load bearing surfaces of the ball and socket coupling is effected, particularly at the opposite ends of the ball diameter parallel to the worm axis which are subject to the maximum load during power steering operation as described below.

The position of the ball element 32 is determined by the position of the ring 37. In FIG. 2, the ball element 32 is shown at the centered straight ahead steering position, which is also at the lowermost position of its arc of swinging movement. Thus when the crank arm 30 swings in either direction from the centered steering position shown, the stem 33 and cross shaft 31 will necessarily move axially to the right in FIG. 2 and the piston extension 14 will rotate counterclockwise as it simultaneously moves axially. At the limit of steering movement in either direction, the ball element 32 will lie approximately as far above the axial plane of the worm 19 parallel to the axis of shaft 31 as it now lies below that plane.

The swinging crank arm 30 extends to the cross or rock shaft 31 perpendicularly with respect to the aforesaid axial plane when the steering mechanism is in the straight ahead steering position illustrated in FIGURES 1 and 2 and is preferably formed integrally with the rock shaft 31. The latter is pivotal about an axis transverse to the axis of the worm 19 and is journaled in a housing extension 10b by means of needle bearings 42 and 43. The left end of rock shaft 31 comprises an integral tapered spline 44 adapted to be connected with the customary linkage for steering the vehicle ground engaging wheels. A suitable seal assembly 45 prevents axial endwise leakage of lubricating fluid from the housing 10b.

The right end of rock shaft 31 is provided with an endwise opening socket 46 axially slidable over and rotatable on an annular coaxial guide portion 47 of a sleeve type closure 48. The latter closes the right end of housing 10b and is secured in position by an annular nut 49. A coil spring 50 seated under compression between the closure 48 and the base of socket 46 resiliently resists the aforesaid rightward axial movement of cross shaft 31 during steering from the centered position shown. An air breather opening 52 is provided in closure 48 to facilitate this movement. A suitable annular seal 53 is provided between closure 48 and housing 10b to prevent leakage from the latter, and an annular seal 54 is provided between guide 47 and the interior of socket 46 to prevent leakage of pressurized fluid from the interior of housing 10b into the region of socket 46 and bleed opening 54.

As is apparent from the above, the center of ball element 32 will swing around the axis of worm 19 at a constant radius upon the coaxial rotation of sleeve 14 around worm 19 during operation. Also the axis of follower 21 will always extend radially toward the axis of worm shaft 19 throughout the steering movement. No relative axial movement of follower 21 with respect to worm shaft 19 will take place and the tension of spring 28 urging follower 21 against the worm 19 will remain unchanged, resulting in a uniform steering feel and returnability throughout the steering movement.

Rightward of the worm 19, FIGURE 1, the bore of the tubular shaft portion 17a receives a relatively rotatable hollow cylindrical valve spool 57 having an inner chamber 58 closed at its right end and opening leftwardly to communicate with a source of pressurized fluid by means of a supply conduit 59 which extends coaxially from the left end of spool 57 and freely through the worm 19, which rotates independently thereof. The left end of conduit 59 extends into a tubular fitting 60 screwed into the housing extension 10a to complete a fluid tight connection and adapted externally at 61 for connection with a source of pressurized fluid, as for example the outlet of a power steering pump. Annular seals 62 and 63 around the conduit 59 and fitting 60 prevent axial endwise leakage of pressurized fluid from the housing extension 10a.

The right end of chamber 58 is closed by an integral end portion of spool 57 which in turn has a rightwardly opening socket portion 57a of reduced external diameter connected to the left end of a tubular valve actuator or driving shaft 64 by means of a radially extending ball headed pin 65. The latter is secured firmly within socket portion 57a and has a ball head 65a confined within an endwise opening wedge shaped recess 64a in the left end of shaft 64, FIG. 5. Fluid pressure applied to valve spool 57 via conduit 59 urges the spool 57 rightward to maintain ball 65a seated within the narrow portion of notch 64a, at the same time allowing for unavoidable slight misalignment between the axes of spool valve 57 and the shaft 64 resulting from production tolerances.

The enlarged left end of a torsion rod 66 is keyed by means of a diametrical pin 67 to driven shaft 17 for rotation as a unit therewith, the pin 67 also passing diametrically through aligned oversize lost motion holes 64b in shaft 64 to enable more than 8° rotation of the latter shaft in either direction relative to the left end of rod 66 without engaging pin 67. The torsion rod 66 extends coaxially within the valve actuator or driving shaft 64 and terminates at the right in an enlarged end keyed by means of a diametrical pin 68 to the driving shaft 64 for rotation as a unit therewith. As indicated in FIGS. 1 and 6, the shaft 64 is provided with a plurality of integral radial driving lugs 64c which interfit with a corresponding plurality of radial driven extensions 17c integral with shaft 17 and spaced circumferentially to provide 8° clearance in either direction from the extensions 64c when the gear is in the neutral position shown for steering straight ahead. Two sets of needle bearings 69 and 70 between shafts 64 and 17 facilitate their relative rotation. An O-ring seal 71 between the enlarged end of torsion rod 66 and an enlarged inner diameter right end portion of shaft 64 prevents endwise leakage of hydraulic fluid to the exterior of the gear and is retained in position by a sleeve 72 through which pin 68 extends. The driving shaft 64 is operably connected to the customary manually actuated steering wheel and steering shaft of the automobile by means of a universal coupling 73, shown in phantom, FIG. 1.

In operation of the device described thus far, rotation of the manual steering wheel rotates coupling 73 and in turn rotates driving shaft 64 about its longitudinal axis. The rotation of shaft 64 is imparted directly to the valve spool 57 to rotate the latter and thereby to direct pressurized fluid either to the left or right side of piston 12 as described below to move the piston 12 to the right or left in FIG. 1 and swing crank arm 30 correspondingly by means of the ball and socket coupling 32, 37, so as to effect the desired turn. The initial rotation of the driving shaft 64 will be yieldingly resisted by the torsion rod 66 connected thereto at its right end by pin 68 and connected at its left end to the driven shaft 17 by pin 67. The resistance will be determined by the road reaction on the dirigible wheels of the vehicle which resist turning of the rock shaft 31 and thereby resist rotation of worm gear 19 and shaft 17. In this situation there will be practically no load on follower 21. In the event of hydraulic power failure, torsion rod 66 will either cause rotation of the driven shaft 17 directly if the road reaction is comparatively light, as for example during high speed driving, or the right end of torsion rod 66 will rotate with driving shaft 64 approximately 8° with respect to the driven shaft 17 until lug 64c engages lug 17c to rotate shaft 17 and worm 19, thereby to move piston 12 linearly to effect manual steering by reason of follower 21 in the worm grooves 19b.

In order to effect hydraulic power steering, the shaft extension 17a is provided with two pairs of axially spaced work ports or openings 76L and 76R at the region of the valve spool 57 and separated by annular seals 77 and 78 arranged between the outer circumference of shaft extension 17a and the interior of piston extension 14, and between a center sealing land 80 of valve 57 and the interior of shaft extension 17a, to cooperate with piston 12 in partitioning the cylinder 11 into the aforesaid left and right parts. Annular sealing lands 79 and 81 are provided around the periphery of valve 57 adjacent its left and right edges respectively, FIGURE 1, to engage the interior of shaft 17a and prevent leakage of pressurized fluid to and from the valve porting system described below. The lands 79 and 80 are spaced by the pair of diametrically opposed ports 76L, whereas the lands 80 and 81 are spaced by the diametrically opposed ports 76R, FIGS. 1, 3 and 4.

Communicating with the chamber 58 and extending diametrically through the circumferential sidewall of the valve 57 at the regions of the work openings 76L and 76R respectively are two axially spaced supply ports 81L and 81R, which terminate in radially outwardly opening enlargements 82L and 82R, respectively, FIGURES 3 and 4. Associated respectively with the supply ports 81L and 81R are a pair of return ports 83L and 83R extending radially into the outer surface of the inner valve member 57 at locations spaced 90° circumferentially from the associated supply ports. The return ports 83L and 83R open radially outwardly at enlargements 84L and 84R respectively, FIGURES 3 and 4, and communicate with a pair of return conduits 84 which extend axially through the inner valve 57, so as to open axially into a space 75 between the left end of valve 57 and the right end 19a of worm shaft 19 to drain fluid therefrom, and also to open at the right end of valve 57 into the reduced diameter socket 57a, thence via openings 64a and 64b and leakage past bearings 69 and the left end of torsion rod 66 into annular fluid return conduits comprising the spaces between valve driving shaft 64 and both driven shaft 17 and torsion rod 66, and thence through a plurality of radial ducts 85 in driving shaft 64, FIGS. 1 and 6.

Each of the work ports 76L is associated with one of each of the supply ports 81L and return ports 83L and is arranged between these associated ports when the valve is at its neutral position shown, FIGURES 3 and 4. Similarly each of the work ports 76R is associated with one of each of the supply ports 81R and return ports 83R and is arranged between these associated ports when the valve is at the neutral position. Also when the valve spool 57 is in the neutral position illustrated in FIGURES 3 and 4, each work port 76 (L or R) is in partial communication with both its associated supply port 81 (L or R) and return port 83 (L or R), so that pressurized fluid entering the chamber 58 from conduit 59 will be discharged through the supply ports 81L and 81R into the associated work ports 76L and 76R and thence into the associated return ports 83L and 83R to the axial return ducts 84.

The work ports 76L and 76R are offset approximately 90° from each other so that rotation of the valve member 57 counterclockwise in FIGURES 3 and 4 will close the communication between the supply ports 81R and work ports 76R, and open the communication between the work ports 76R and return ports 83R. Similarly the communication between supply ports 81L and work ports 76L will be increased and the communication between work ports 76L and return ports 83L will be closed. Pressurized fluid will thus be discharged through work ports 76L into the annular flow passage 87 at the left of seal 77 between supporting sleeve 14 and shaft extension 17a, and thence along worm 19b and through port 88 in sleeve 14 to the left side of piston 12 in cylinder 11 to drive the piston 12 from left to right, whereby the tapered nose of follower 21 within the worm groove of shaft 19, FIGURES 1 and 2, will rotate the latter counterclockwise in FIGURES 3 and 4 to return the valving to the neutral position shown and swing crank arm 30 and rock shaft 31 to effect a left turn for the vehicle. Pressurized fluid at the right side of the piston 12 will be returned as described below to the work openings 76R and discharged via return ports 83R to return conduits 84.

It is apparent from the foregoing that upon clockwise rotation of valve member 57 with respect to worm shaft 19 in FIGURES 3 and 4, the pressurized fluid will be supplied through ports 81R to openings 76R and thence to annular conduit 89 at the right of seal 77 between piston 12 and shaft 17 and to the right side of piston 12 in cylinder 11 to drive the piston from right to left and effect a righthand turn for the vehicle. In this event, the return fluid will be discharged from the left side of piston 12 into work opening 76L and thence through ports 83L to return ducts 84 via port 88 and conduit 87. The return flow from the right side of piston 12 to return ducts 84 when the left side of the piston is pressurized will be the reverse of the flow path described above for pressurizing the right side of piston 12.

The annular return conduits within and around shaft 64 connect the return ducts 84 with the plurality of radial ports 85 in shaft 64. The ports 85 communicate radially outwardly of the shaft 64 with an annular space or chamber 91 around the right end of shaft 17 and thence with a return connection 92 adapted to be connected with a reservoir or with the inlet side of the power steering pump. As illustrated in FIG. 6, shaft 64 is provided with a plurality of integral radial outwardly extending lugs 64c at locations spaced by the ducts 85, the lugs 64c in turn being spaced by radially inwardly extending lugs 17c integral with the right end of shaft 17 and providing adequate clearance for the return flow of fluid into chamber 91. The lugs 17c and 64c are also spaced circumferentially approximately 8°, so that in the event of power failure, the lugs 64c will engage the lugs 17c after manual rotation of shaft 64 in either direction from the neutral position shown and thereby effect manual steering by rotating shaft 17 upon continued manual turning of shaft 64.

The driven shaft assembly 17, 19 is held in axial position with respect to the housing 10 by means of an annular stop or bearing race 93 abutting an annular shoulder 94 of an end closure 95 containing cylinder 11 and secured in position by a flanged nut 96 screwed on a portion of housing 10 and engaging a radial boss 98 integral with closure 95, FIGURE 1. The race 93 is secured against leftward movement in FIG. 1 by a nut 97 screwed into an internally threaded portion of closure 95. A suitable annular seal 99 around closure 95 prevents loss of fluid axially from housing 10. A pair of annular needle bearings 100 are spaced by stop 93 coaxially around shaft 17 and are spaced in turn by a pair of bearing races 103 from a radial shoulder 101 of shaft 17 and a retaining nut 102 screwed on the right end of shaft 17. An annular seal 104 around shaft 17 at the inner periphery of the race 93 prevents axial endwise leakage from cylinder 11 along shaft 17. The space 91 at the right of the ducts 85 is closed by suitable seal assembly 105 between shaft 17 and closure 95. Access to nut 34 on ball stem 33 is feasible upon removal of a circular closure plate 106 interfitting within a cylindrical well 107 of housing 10 and held in position by a nut 108 screwed on the outer extension of well 107.

I claim:
1. In a vehicle steering gear,
  (A) rotatable worm means including a worm portion and a hollow portion, the latter having radially opening ports therein,
  (B) rotatable valve means within said hollow portion and cooperating with said ports to direct pressurized fluid selectively through said ports upon relative rotation of said valve means with respect to said worm means,
    (1) said valve means having a central chamber opening axially at one end of said valve means to receive pressurized fluid and closed at its axially opposite other end, and
    (2) opening radially to discharge said fluid selectively to said ports upon said relative rotation,
  (C) duct means including an axially extending duct in said worm means for supplying said pressurized fluid to the opening of said chamber at said one end of said valve means and for exerting the pressure of said fluid to urge said valve means axially in the direction from said one end to said axially opposite other end of said valve means,
  (D) manually rotatable valve driving means adjacent said other end of said valve means,
  (E) an interconnection between the latter two means for rotating said valve means upon rotation of said valve driving means comprising:
    (1) a tapered notch in one of said latter two means opening axially and diverging in the direction of opening, and
    (2) a projection on the other of said latter two means seated within said notch eccentrically with respect to the axis of rotation of said valve means for limiting the fluid pressure urged movement of said valve means in the first named direction,
  (F) lost motion means interconnecting said valve driving means and worm means to rotate the latter manually after relative rotation of the former through a predetermined limited extent of lost motion in the interconnection therebetween,

(G) supporting means movable axially of said worm means, (H) fluid pressure circuit means including a fluid motor cooperable with said ports for selectively moving said supporting means axially in response to said relative rotation of said valve means and the flow of said fluid through said ports, (I) means on said supporting means cooperable with said worm means for moving said supporting means axially upon manual rotation of said worm means, and (J) means on said supporting means for connection with a steering linkage to actuate the same upon axial movement of said supporting means.

2. In the combination according to claim 1, the portion of said projection seated within said notch comprising a spherical element to complete a universal coupling between the aforesaid latter two means.

3. In the combination according to claim 2, said manually rotatable valve driving means and said other end of said valve means interfitting in coaxial telescoping relationship to effect an overlap of said spherical element by one of said means.

4. In the combination according to claim 1, said manually rotatable valve driving means comprising a shaft having one end proximate and interfitting with said other end of said valve means in coaxial telescoping relationship, said shaft extending from its one end coaxially away from said valve means to an opposite end of said shaft, and said projection extending radially into said notch.

5. In the combination according to claim 4, the portion of said projection seated within said notch comprising a spherical element to complete a universal coupling between the aforesaid latter two means.

6. In the combination according to claim 5, said valve means cooperating with said hollow portion to seal the fluid pressure at said one end of said valve means from said other end thereof.

References Cited
UNITED STATES PATENTS

| | | | |
|---|---|---|---|
| 1,078,560 | 11/1913 | Shearer | 64—8 |
| 3,033,051 | 5/1962 | Reinke et al. | |
| 3,138,069 | 6/1964 | Bishop. | |
| 3,145,626 | 8/1964 | Vickers et al. | |
| 3,291,002 | 12/1966 | Folkerts. | |

PAUL E. MASLOUSKY, Primary Examiner

U.S. Cl. X.R.
180—79.2